(12) United States Patent
Miyata

(10) Patent No.: US 6,271,965 B1
(45) Date of Patent: *Aug. 7, 2001

(54) REAR PROJECTION SCREEN HAVING REDUCED SCINTILLATION

(75) Inventor: Hideki Miyata, Shinjuku-Ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,848
(22) PCT Filed: Jul. 23, 1997
(86) PCT No.: PCT/JP97/02546
§ 371 Date: Mar. 26, 1998
§ 102(e) Date: Mar. 26, 1998
(87) PCT Pub. No.: WO98/03898
PCT Pub. Date: Jan. 29, 1998

(30) Foreign Application Priority Data

Jul. 23, 1996 (JP) .................................. 8-193039

(51) Int. Cl.$^7$ .................................................. G03B 21/60
(52) U.S. Cl. .......................................... 359/453; 359/457
(58) Field of Search ................................. 359/452, 453, 359/460, 456, 457

(56) References Cited

U.S. PATENT DOCUMENTS

| | | | |
|---|---|---|---|
| 3,705,757 | * 12/1972 | Huber | 350/126 |
| 3,712,707 | * 1/1973 | Henkes, Jr. | 350/122 |
| 5,196,960 | * 3/1993 | Matsuzaki et al. | 359/453 |
| 5,206,761 | * 4/1993 | Ogino | 359/457 |
| 5,457,572 | * 10/1995 | Ishii et al. | 359/457 |
| 5,477,380 | * 12/1995 | Watanabe et al. | 359/457 |
| 5,485,308 | * 1/1996 | Hirata et al. | 359/457 |
| 5,675,435 | * 10/1997 | Ishii et al. | 359/460 |
| 5,724,182 | * 3/1998 | Mitani et al. | 359/457 |
| 5,760,955 | * 6/1998 | Goldenberg et al. | 359/456 |
| 5,880,887 | * 3/1999 | Goto | 359/626 |

FOREIGN PATENT DOCUMENTS

| | | | |
|---|---|---|---|
| 8-15780 | 1/1996 | (JP) | G03B/21/62 |
| 9-114003 | 5/1997 | (JP) | G03B/21/62 |

* cited by examiner

Primary Examiner—Christopher E. Mahoney
(74) Attorney, Agent, or Firm—Parkhurst & Wendel, LLP

(57) ABSTRACT

A rear projection screen of the present invention includes lens sheets or optical sheets having an optical function of condensing or diffusing light. The lens sheets or optical sheets have, as a whole, two or more diffusing layers (diffusing parts) separately provided in the light-transmitting direction. It is preferable that one of the two or more diffusing layers be provided on the light-entering-side surface of the outermost lens sheet or optical sheet on the light source side and that another one of the diffusing layers be provided on the light-emerging-side surface of the outermost lens sheet or optical sheet on the observation side. Any two of the two or more diffusing layers are such that the light-source-side diffusing layer has a diffusing power lower than that of the observation-side diffusing layer. Further, it is preferable that the types (refractive indexes or average particle diameters) of diffusers to be respectively incorporated into any two of the two or more diffusing layers be different from each other.

16 Claims, 6 Drawing Sheets

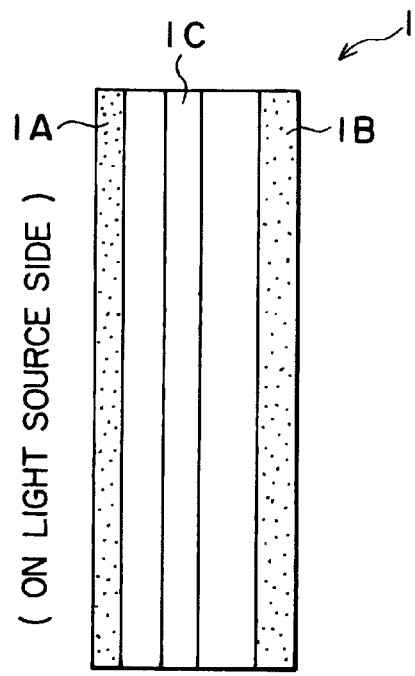
F I G. 1
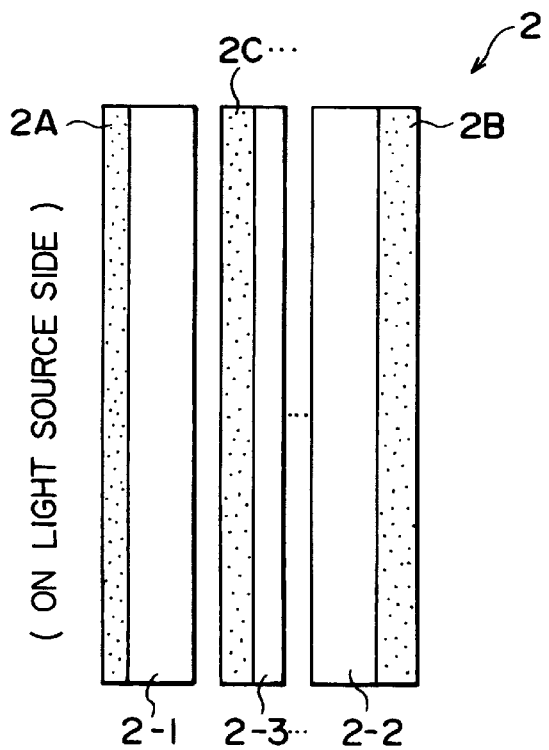
F I G. 2

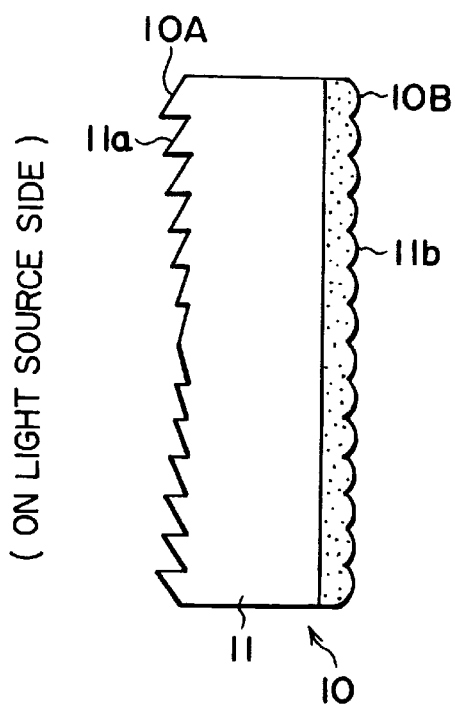
F I G. 3
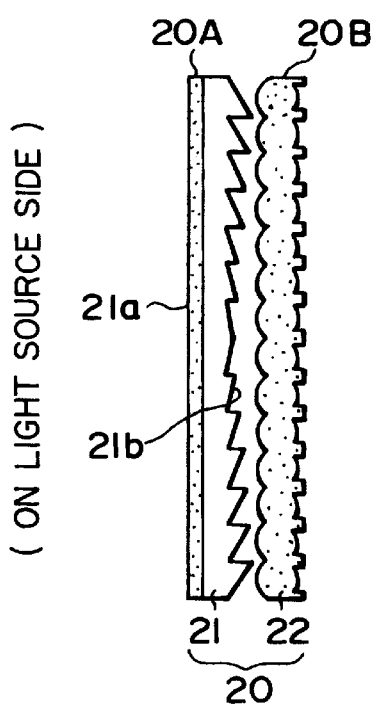
F I G. 4

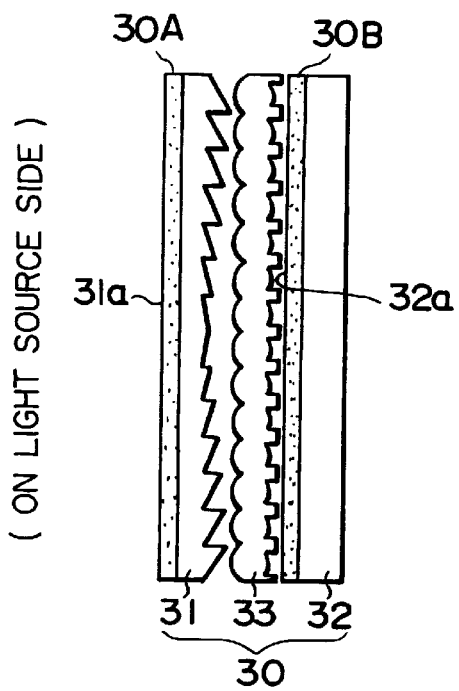
F I G. 5
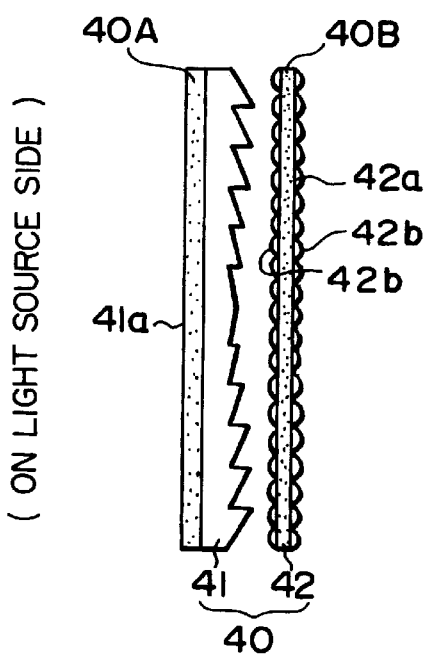
F I G. 6

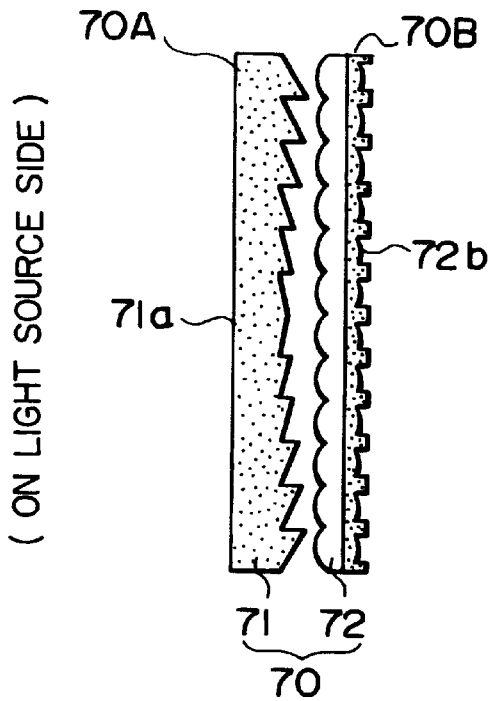
F I G. 9A
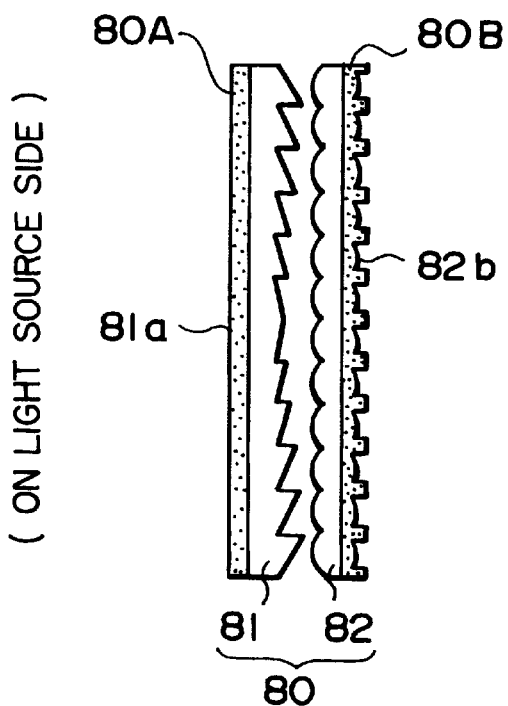
F I G. 9B

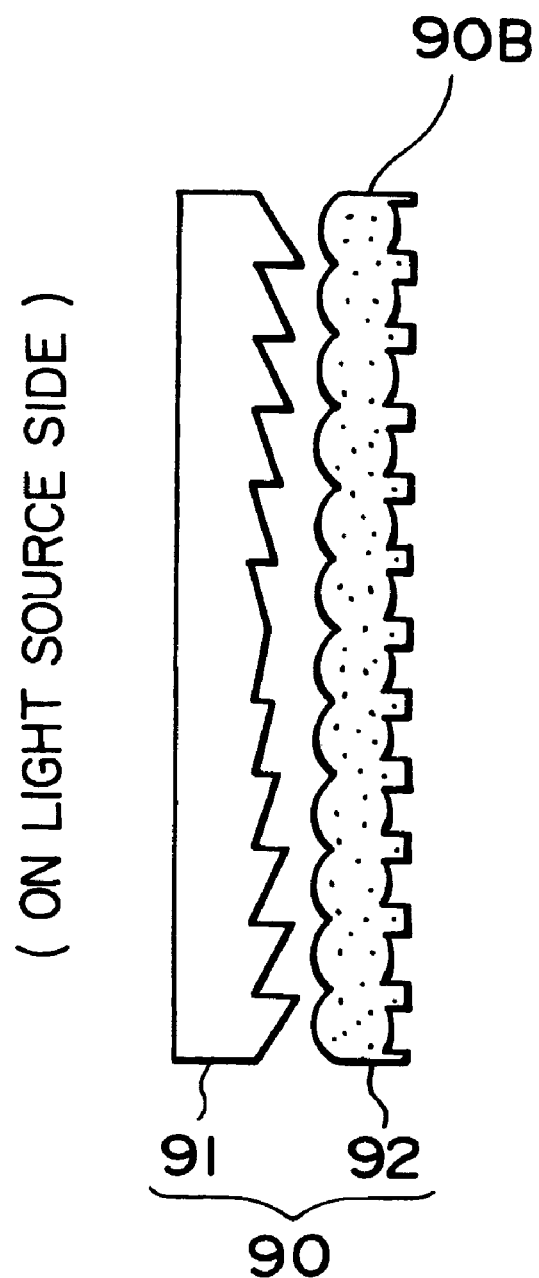
(COMPARATIVE EXAMPLE)
F I G. 10

REAR PROJECTION SCREEN HAVING REDUCED SCINTILLATION

TECHNICAL FIELD

The present invention relates to rear projection screens chiefly used for rear-projection-type projectors such as video projectors and slide projectors.

BACKGROUND ART

As rear projection screens of this type, there have conventionally been known those screens composed of a single lenticular lens sheet comprising as a base material a synthetic resin such as polymethyl methacrylate, and those screens composed of such a lenticular lens sheet and other lens sheets. To form images on these rear projection screens, imaging light is projected on the screens by using light sources such as CRTs.

In recent years, projection tubes having small projection apertures, such as liquid crystal projectors and light bulbs came to be used as light sources in place of CRTs. However, the conventional rear projection screens have such a problem that, when images are formed on these screens by the use of projection tubes having small projection apertures, scintillation or speckle is caused on the images.

In order to solve this problem, there have conventionally been proposed a method in which the screens are scanned by using laser light sources (see Japanese Patent Laid-Open Publication No. 173094/1993); a method in which the screens are vibrated (see Reference 1 (J. Opt. Soc. Am., Vol. 66, No. 11, November 1976, "Speckle-free rear-projection screen using two close screens in slow relative motion")); and a method in which large amounts of diffusers are incorporated into lens sheets.

DISCLOSURE OF THE INVENTION

However, in the aforementioned conventional methods, the modification of the projectors themselves is needed, or additional apparatus are required in order to prevent images from undergoing scintillation or the like. Further, the incorporation of large amounts of diffusers into lens sheets causes such troubles that the gain is decreased and that the resolution is unfavorably lowered.

The present invention was accomplished in view of the above-described drawbacks. An object of the present invention is therefore to provide a rear projection screen capable of forming thereon an image free from scintillation or the like with the decrease in gain and resolution minimized without using any additional apparatus even when a projection tube having a small projection aperture is used The first aspect of the present invention is a rear projection screen comprising a lens sheet having an optical function of condensing or diffusing light, wherein the lens sheet has two or more diffusing parts separately provided in a light-transmitting direction.

In the first aspect of the present invention, it is preferable that one of the two or more diffusing parts be provided on a light-entering-side surface of the lens sheet and that another one of the diffusing parts be provided on a light-emerging-side surface of the lens sheet. Further, it is preferable that the two or more diffusing parts be provided on a surface of the lens sheet and inside the same.

The second aspect of the present invention is a rear projection screen comprising two or more lens sheets or optical sheets having an optical function of condensing or diffusing light, wherein at least one of the two or more lens sheets or optical sheets has at least one diffusing part, and the two or more lens sheets or optical sheets have, as a whole, two or more diffusing parts.

In the second aspect of the present invention, it is preferable that the diffusing parts be provided on surfaces of the two or more lens sheets or optical sheets, or inside the same. Further, it is preferable that the diffusing part of the outermost lens sheet or optical sheet on a light source side be provided on the light-entering-side surface of this lens sheet or optical sheet and that the diffusing part of the outermost lens sheet or optical sheet on an observation side be provided on a light-emerging-side surface of this lens sheet or optical sheet.

In the above-described first and second aspects of the present invention, any two of the two or more diffusing parts are preferably such that a light-source-side diffusing part has a diffusing power lower than that of an observation-side diffusing part. Further, any two of the two or more diffusing parts are preferably such that a light-source-side diffusing part is formed by incorporating first diffusive fine particles into a first base material, that an observation-side diffusing part is formed by incorporating second diffusive fine particles into a second base material and that a difference between a refractive index of the first diffusive fine particles and that of the first base material is smaller than a difference between a refractive index of the second diffusive fine particles and that of the second base material.

BRIEF DESCRIPTION OF THE DRAWINGS

FIG. 1 is an illustration showing a first embodiment of a rear projection screen according to the present invention.

FIG. 2 is an illustration showing a second embodiment of a rear projection screen according to the present invention.

FIG. 3 is an illustration showing a rear projection screen of Example 1 according to the present invention.

FIG. 4 is an illustration showing a rear projection screen of Example 2 according to the present invention.

FIG. 5 is an illustration showing a rear projection screen of Example 3 according to the present invention.

FIG. 6 is an illustration showing a rear projection screen of Example 4 according to the present invention.

FIGS. 9A and 9B are illustrations showing rear projection screens of Example 7 according to the present invention.

FIG. 10 is an illustration showing a comparative rear projection screen.

BEST MODE FOR CARRYING OUT THE INVENTION

Figure 7:
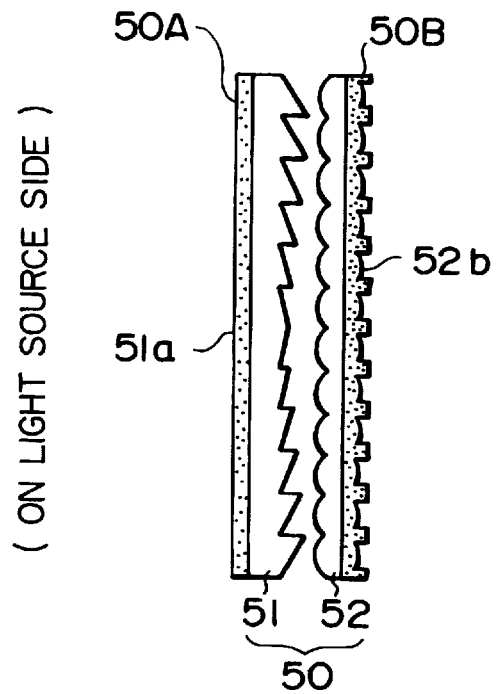
FIG. 7 is an illustration showing a rear projection screen of Example 5 according to the present invention.

By referring now to the accompanying drawings, embodiments of the present invention will be described below.

First Embodiment

FIG. 1 is an illustration showing a first embodiment of a rear projection screen according to the present invention.

As shown in FIG. 1, a rear projection screen 1 is composed of a single lens sheet having on one surface or both surfaces thereof a Fresnel lens or lenticular lenses, wherein two or more diffusing parts 1A, 1B are provided separately in the light-transmitting direction (in the direction of the left and right sides in the figure). In this first embodiment, the diffusing parts 1A and 1B are provided on the light-enteringside surface (light-entering surface) and light-emerging-side surface (light-emerging surface) of the lens sheet, respectively.

The diffusing parts 1A, 1B are parts for diffusing light, and can readily be formed by a conventional method, for example, by using a resin layer containing a diffuser (diffusive fine particles) such as microlenses, glass beads or organic beads, or by embossing the surfaces of microlenses.

It is noted that the diffusing parts can be provided not only on the surfaces of the lens sheet but also inside the lens sheet like a diffusing part 1C.

The diffusing parts 1A, 1B diffuse light emitted from a light source to destroy the coherence of the light, so that they can solve the problem of scintillation or speckle. However, when light from a light source is diffused, the resolution is lowered. Further, when a large amount of a diffuser is incorporated into one diffusing part as in the conventional method, the gain is decreased, and the image thus becomes very dark.

According to the first embodiment of the present invention, since the two diffusing parts 1A and 1B are separately provided on the lens sheet, it is possible to make the intensity of scintillation or the like low by using a diffuser in an amount smaller than that of a diffuser which is required for a lens sheet having only one diffusing part to attain the equally low intensity of scintillation or the like. Moreover, since the amount of the diffuser used is small, the lowering of the gain is prevented, and the brightness of the image can thus be prevented from being unfavorably decreased.

Further, since the two diffusing parts 1A and 1B are separately provided on the lens sheet, it is enough to incorporate a decreased amount of a diffuser into one diffusing part. Therefore, the amount of stray light to be produced inside the diffusing parts 1A, 1B can be decreased, and the unfavorable lowering of resolution to be caused by flare, ghost or the like can thus be prevented.

Furthermore, by this light-diffusing effect, moires to be formed by the interference between Fresnel lenses, lenticular lenses, or pixels of a light source can be decreased.

It is preferable that the diffusing parts 1A and 1B be provided on the light-entering-side surface and light-emerging-side surface of the lens sheet, respectively. The reason for this is as follows. When the diffusing parts 1A and 1B are provided at the above-described positions, the distance between the two diffusing parts becomes long, so that light emitted from a light source cannot show coherence. Therefore, the intensity of scintillation or the like can be decreased, and the lowering of the brightness of the image can be minimized while controlling the light-diffusing effect at the diffusing parts 1A and 1B to extremely low.

Further, it is preferable that the diffusing power of the diffusing part 1A on the light source side be made lower than that of the diffusing part 1B on the observation side. By doing so, the degree of the diffusion of light which is caused on the light-entering side by diffusing elements becomes low. The intensity of scintillation or the like can thus be decreased while preventing the resolution from being unfavorably lowered.

Scintillation or the like can be evaluated not only by the above-described intensity of scintillation or the like, but also by the magnitude (roughness) of scintillation or the like which is caused when a dynamic picture image is projected. In order to decrease the intensity of scintillation or the like, it is preferable to use such a diffuser that the difference between the refractive index of the diffuser and that of a base material in which the diffuser is dispersed is small. On the other hand, in order to decrease the magnitude (roughness) of scintillation or the like, it is preferable to use a diffuser whose average particle diameter is small.

For this reason, when only scintillation or the like is taken into consideration, it seems to be effective to incorporate, into both the diffusing part 1A on the light source side and the diffusing part 1B on the observation side, a diffuser whose average particle diameter is small and whose refractive index is such that the difference between the refractive index of the diffuser and that of a base material in which the diffuser is dispersed is small. However, a diffuser whose refractive index is such that the difference between the refractive index of the diffuser and that of a base material in which the diffuser is dispersed is small, or a diffuser whose average particle diameter is small makes the angle of visibility narrow. Therefore, in order to solve the problem of scintillation or the like and that of the angle of visibility at the same time, it is preferable that the type of a diffuser to be incorporated into the diffusing part 1A be made different from that of a diffuser to be incorporated into the diffusing part 1B.

Specifically, as will be described later in Example 7, it is preferable that the difference between the refractive index of a diffuser to be incorporated into the diffusing part 1A on the light source side and that of a base material in which the diffuser is dispersed be made smaller than the difference between the refractive index of a diffuser to be incorporated into the diffusing part 1B on the observation side and that of a base material in which the diffuser is dispersed, and that a diffuser having an average particle diameter not greater than a predetermined size (e.g., 15 micrometers) be incorporated into the diffusing part 1B on the observation side.

A variety of methods have been known as the method for controlling the degree of the diffusion of light. Specifically, when a diffusing part is formed by means of embossing, irregularities to be produced by embossing are changed; and when a diffuser is employed, the particle diameter, refractive index, or amount of the diffuser to be used is changed. The relationship between the particle diameter, refractive index or the like of a diffuser and the light-diffusing effect is described in, for example, Reference 2 (J. Opt. Soc. Am. A, Vol. 2, No. 12, December 1985, "Diffraction analysis of bulk diffusers for projection-screen applications").

Second Embodiment

FIG. 2 is an illustration showing a second embodiment of a rear projection screen according to the present invention.

As shown in FIG. 2, a rear projection screen 2 is composed of two or more lens sheets or optical sheets 2-1, 2-2, 2-3, . . . , and diffusing parts 2A, 2B, 2C, . . . are provided on the lens sheets or optical sheets 2-1, 2-2, 2-3, . . . , respectively.

In this figure, the diffusing part 2A is provided on the light-emitting-side surface (light-entering surface) of the outermost lens sheet or optical sheet 2-1 on the light source side; the diffusing part 2B is provided on the light-emerging-side surface (light-emerging surface) of the outermost lens sheet or optical sheet 2-2 on the observation side; and the diffusing part 2C is provided on the light-entering-side surface (light-entering surface) of the lens sheet or optical sheet 2-3.

As the lens sheet for use in this embodiment, it is possible to employ a linear or circular Fresnel lens sheet, a lenticular lens sheet having on one surface or both surfaces thereof lenticular lenses, a lens sheet having on each surface thereof a combination of Fresnel lenses or lenticular lenses, or the like.

As the optical sheet, a panel made from polymethyl methacrylate or the like, whose both surfaces are flat, or the like can be used.

The properties of the diffusing parts 2A, 2B, 2C, . . . , and the properties related to the configuration of the diffusing parts 2A, 2B, 2C, . . . , are the same as those of the diffusing parts 1A, 1B, 1C in the above-described first embodiment. Therefore, detailed explanations for these properties are herein omitted.

EXAMPLES

Specific examples of the rear projection screens as shown in FIGS. 1 and 2 will be given below.

Example 1

FIG. 3 is an illustration showing a rear projection screen of Example 1 according to the present invention. Example 1 corresponds to the first embodiment shown in FIG. 1, and, in this rear projection screen of Example 1, two diffusing layers (diffusing parts) are separately provided on both surfaces of a single lens sheet.

Namely, in this Example, a rear projection screen 10 was produced, as shown in FIG. 3, by respectively providing diffusing layers 10A and 10B on the light-entering surface 11a and light-emerging surface 11b of a lens sheet 11 made from polymethyl methacrylate, having a thickness of 5 mm. The diffusing layer 10A was formed on the light-entering surface 11a by embossing a Fresnel lens part on the light-entering surface 11a. On the light-emerging surface 11b of the lens sheet 11 was formed the diffusing layer 10B having a thickness of 500 micrometers, in which 15 parts by weight of glass beads having an average particle diameter of 11 micrometers and a refractive index of 1.535 were dispersed. It is noted that, in this Example and also in the following Examples 2 to 7 and Comparative Example, the amount (parts by weight) of the diffuser such as glass beads is a value based on 100 parts by weight of the base material into which the diffuser is incorporated.

As the base material of the lens sheet 11, an impact-resistant methacrylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used.

An image was projected on the thus-produced rear projection screen 10 by using an LCD projector, and observed for evaluation. As a result, it was confirmed that the intensity of scintillation caused on the image was low and that the resolution of the image was excellent.

Example 2

FIG. 4 is an illustration showing a rear projection screen of Example 2 according to the present invention. Example 2 corresponds to the second embodiment shown in FIG. 2, and, in this rear projection screen of Example 2, two diffusing layers (diffusing parts) are separately provided on two lens sheets, one diffusing part on one lens sheet. One of the two diffusing layers is provided on the surface of the lens sheet (the light-entering-surface of a Fresnel lens sheet).

Namely, in this Example, a rear projection screen 20 was produced, as shown in FIG. 4, by the combination use of a Fresnel lens sheet 21 having a thickness of 2 mm, made from polymethyl methacrylate, and a lenticular lens sheet 22 having a thickness of 1 mm, made from polymethyl methacrylate. On the light-entering surface 21a of the Fresnel lens sheet 21 was formed a diffusing layer 20A having a thickness of 150 micrometers, in which 7.0 parts by weight of organic beads (cross-linked polymer beads) having an average particle diameter of 12 micrometers and a refractive index of 1.59 were dispersed. Further, into the lenticular lens sheet 22 (diffusing layer 20B) were homogeneously incorporated 0.75 parts by weight of organic beads having an average particle diameter of 12 micrometers and a refractive index of 1.59.

As the base material of the Fresnel lens sheet 21 and that of the lenticular lens sheet 22, an impact-resistant methacrylic resin (refractive index 1.51) manufactured by Sumitomo Chemical Co., Ltd., Japan was used. As the organic beads having an average particle diameter of 12 micrometers and a refractive index of 1.59, "PB3011" (styrene beads) manufactured by Sumitomo Chemical Co., Ltd., Japan was used.

An image was projected on the thus-produced rear projection screen 20 by using an LCD projector, and observed for evaluation. As a result, it was confirmed that the intensity of scintillation caused on the image was low and that the resolution of the image was excellent.

Example 3

FIG. 5 is an illustration showing a rear projection screen of Example 3 according to the present invention. Example 3 corresponds to the second embodiment shown in FIG. 2, and, in this rear projection screen of Example 3, two diffusing layers (diffusing parts) are separately provided on three lens/optical sheets. One of the two diffusing layers is provided on the surface of the outermost lens sheet on the light source side (the light-emitting-surface of a Fresnel lens sheet), and the other diffusing layer is provided on the surface of the outermost optical sheet on the observation side (the light-entering-surface of a flat face panel).

Namely, in this Example, a rear projection screen 30 was produced, as shown in FIG. 5, by the combination use of a Fresnel lens sheet 31 having a thickness of 2 mm, made from polymethyl methacrylate, a flat face panel 32 having a thickness of 2 mm, made from polymethyl methacrylate, and a lenticular lens sheet 33 having a thickness of 1 mm, made from polymethyl methacrylate, containing no diffuser, provided between the Fresnel lens sheet 31 and the flat face panel 32. On the light-entering surface 31a of the Fresnel lens sheet 31 was formed a diffusing layer 30A having a thickness of 150 micrometers, in which 45 parts by weight of glass beads having an average particle diameter of 11 micrometers and a refractive index of 1.535 were dispersed. On the light-entering surface 32a of the flat face panel 32 was formed a diffusing layer 30B having a thickness of 150 micrometers, in which 45 parts by weight of glass beads having an average p article diameter of 11 micrometers and a refractive index of 1.535 were dispersed.

As the base materials of the Fresnel lens sheet 31, of the flat face panel 32 and of the lenticular lens sheet 33, an impact-resistant methacrylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used.

An image was projected on the thus-produced rear projection screen 30 by using an LCD projector, and observed for evaluation. As a result, it was confirmed that the intensity of scintillation caused on the image was low and that the resolution of the image was excellent.

Example 4

FIG. 6 is an illustration showing a rear projection screen of Example 4 according to the present invention. Example 4 corresponds to the second embodiment shown in FIG. 2, and, in this rear projection screen of Example 4, two diffusing layers (diffusing parts) are separately provided on two lens sheets. One of the two diffusing layers is provided on the surface of the outermost lens sheet on the light source side (the light-entering-surface of a Fresnel lens sheet), and the other diffusing layer is provided inside the outermost lens sheet on the observation side (inside a lenticular lens sheet). Further, the diffusing layer provided on the light source side has a diffusing power lower than that of the diffusing layer provided on the observation side.

Namely, in this Example, a rear projection screen 40 was produced, as shown in FIG. 6, by the combination use of a Fresnel lens sheet 41 having a thickness of 2 mm, made from polymethyl methacrylate, and a lenticular lens sheet 42 obtained by forming transparent lenses 42b on both surfaces of a film 42a having a thickness of 200 micrometers, made from polymethyl methacrylate. On the light-entering surface 41a of the Fresnel lens sheet 41 was formed a diffusing layer 40A having a thickness of 100 micrometers, in which 35 parts by weight of glass beads having an average particle diameter of 11 micrometers and a refractive index of 1.535 were dispersed. Further, into the film 42a (diffusing layer 40B) of the lenticular lens sheet 42 were homogeneously incorporated 10.0 parts by weight of organic beads having an average particle diameter of 12 micrometers and a refractive index of 1.59.

As the base material of the Fresnel lens sheet 41, an impact-resistant methaciylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used. Further, as the organic beads having an average particle diameter of 12 micrometers and a refractive index of 1.59, "PB3011" (styrene beads) manufactured by Sumitomo Chemical Co., Ltd., Japan was used. The lenticular lens sheet 42 was obtained by covering, with the film 42a, a UV- (ultraviolet-) or EB- (electron beam-) curable resin poured into a mold in a shape reverse to the shape of the transparent lenses 42b, and applying ultraviolet rays or electron beams to the UV- or EB-curable resin.

An image was projected on the thus-produced rear projection screen 40 by using an LCD projector, and observed for evaluation. As a result, it was confirmed that the intensity of scintillation caused on the image was low and that the resolution of the image was excellent.

Example 5

FIG. 7 is an illustration showing a rear projection screen of Example 5 according to the present invention. Example 5 corresponds to the second embodiment shown in FIG. 2, and, in this rear projection screen of Example 5, two diffusing layers (diffusing parts) are separately provided on two lens sheets. One of the two diffusing layers is provided on the surface of the outermost lens sheet on the light source side (the 10 light-emitting-surface of a Fresnel lens sheet), and the other diffusing layer is provided on the surface of the outermost lens sheet on the observation side (the light-emerging surface of a lenticular lens sheet). Further, the diffusing layer provided on the light source side has a diffusing power lower than that of the diffusing layer provided on the observation side.

Namely, in this Example, a rear projection screen 50 was produced, as shown in FIG. 7, by the combination use of a Fresnel lens sheet 51 having a thickness of 2 mm, made from polymethyl methacrylate, and a lenticular lens sheet 52 having a thickness of 1 mm, made from polymethyl methacrylate. On the light-entering surface 51a of the Fresnel lens sheet 51 was formed a diffusing layer 50A having a thickness of 100 micrometers, in which 35 parts by weight of glass beads having an average particle diameter of 11 micrometers and a refractive index of 1.535 were dispersed. On the light-emerging surface 52b of the lenticular lens sheet 52 was formed a diffusing layer 50B having a thickness of 100 micrometers, in which 12.0 parts by weight of organic beads having an average particle diameter of 12 micrometers and a refractive index of 1.59 were dispersed.

As the base material of the Fresnel lens sheet 51, and that of the lenticular lens sheet 52, an impact-resistant methacrylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used. Further, as the organic beads having an average particle diameter of 12 micrometers and a refractive index of 1.59, "PB3011" (styrene beads) manufactured by Sumitomo Chemical Co., Ltd., Japan was used.

An image was projected on the thus-produced rear projection screen 50 by using an LCD projector, and observed for evaluation. As a result, it was confirmed that the intensity of scintillation caused on the image was low and that the resolution of the image was excellent.

Example 6

Figure 8:
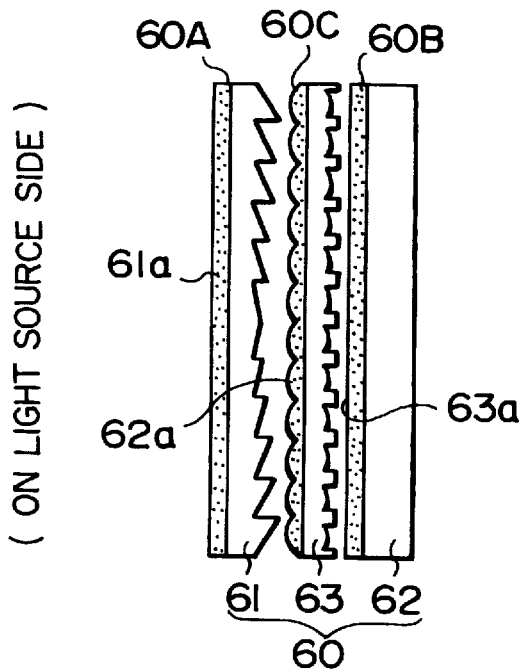
FIG. 8 is an illustration showing a rear projection screen of Example 6 according to the present invention.

FIG. 8. is an illustration showing a rear projection screen of Example 6 according to the present invention Example 6 corresponds to the second embodiment shown in FIG. 2, and, in this rear projection screen of Example 6, three diffusing layers (diffusing parts) are separately provided on three lens/optical sheets, one diffusing layer on one lens or optical sheet. The three diffusing layers are respectively provided on the surfaces (the light-entering surfaces) of the three lens/optical sheets.

Namely, in this Example, a rear projection screen 60 was produced, as shown in FIG. 8, by the combination use of a Fresnel lens sheet 61 having a thickness of 2 mm, made from polymethyl methacrylate, a flat face panel having a thickness of 2 mm, made from polymethyl methacrylate, and a lenticular lens sheet 63 having a thickness of 1 mm, made from polymethyl methacrylate, provided between the Fresnel lens sheet 61 and the flat face panel 62. On the light-entering surface 61a of the Fresnel lens sheet 61 was formed a diffusing layer 60A having a thickness of 100 micrometers, in which 3.5 parts by weight of glass beads having an average particle diameter of 11 micrometers and a refractive index of 1.535 were dispersed. On the light-entering surface 62a of the flat face panel 62 was formed a diffusing layer 60B having a thickness of 100 micrometers, in which 3.5 parts by weight of glass beads having an average particle diameter of 11 micrometers and a refractive index of 1.535 were dispersed. On the light-entering surface 63a of the lenticular lens sheet 63 was formed a diffusing layer 60C having a thickness of 300 micrometers, in which 5.0 parts by weight of organic beads having an average particle diameter of 30 micrometers and a refractive index of 1.49 were dispersed.

As the base materials of the Fresnel lens sheet 61, of the flat face panel 62, and of the lenticular lens sheet 63, an impact-resistant methacrylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used. Further, as the organic beads having an average particle diameter of 30 micrometers and a refractive index of 1.49, "XC01" (acrylic beads) manufactured by Sumitomo Chemical Co., Ltd., Japan was used.

An image was projected on the thus-produced rear projection screen 60 by using an LCD projector, and observed for evaluation. As a result, it was confirmed that the intensity of scintillation caused on the image was low and that the resolution of the image was excellent.

Example 7

FIGS. 9A and 9B are illustrations showing rear projection screens of Example 7 according to the present invention. Example 7 corresponds to the second embodiment shown in FIG. 2, and, in these rear projection screens of Example 7, two diffusing layers (diffusing parts) are separately provided on two lens sheets. Further, the type (refractive index and average particle diameter) of the diuser incorporated into the diffusing layer provided on the light source side is different from that of the eiffuser incorporated into the diffusing layer provided on the observation side.

Namely, in this Example, rear projection screens 70, 80 were produced, as shown in FIGS. 9A and 9B, by the combination use of Fresnel to lens sheets 71, 81 made from polymethyl methacrylate, and lenticular lens sheets 72, 82 having a thickness of 1 mm, made from polymethyl methacrylate. As shown in FIGS. 9A and 9B, the shape and structure of the rear projection screen 70 are identical with those of the rear projection screen 80 except that the structure of the Fresnel lens sheet 71 is different from that of the Fresnel lens sheet 81.

As the base material of the Fresnel lens sheets 71, 81, an impact-resistant methacrylic resin (refractive index 1.51) manufactured by Sumitomo Chemical Co., Ltd., Japan was used. This resin was subjected into extrusion molding, and a Fresnel lens part was formed on one surface of the molded product by coating thereto a UV-curable resin containing no diffuser, followed by curinhg the UV-curable resin by the application of ultraviolet rays, thereby obtaining the Fresnel lens sheets 71, 81. It is noted that the boundary between the substrate and the Fresnel lens part formed thereon by the use of the UV-curable resin is not shown in FIGS. 9A and 9B.

The Fresnel lens sheet 71 shown in FIG. 9A is a lens sheet obtained by forming a Fresnel lens part on one surface of a single layer (diffusing layer 70A), serving as a substrate, into which a diffuser having a predetermined average particle diameter and refractive index is homogeneously incorporated. On the other hand, the Fresnel lens sheet 81 shown in FIG. 9B is a lens sheet obtained by forming a Fresnel lens part on one surface of a co-extruded two-layered substrate having, on the light-emitting surface 81Ia thereof, a diffusing layer 80A in which a diffuser having a predetermined average particle diameter and refractive index is dispersed.

Into the diffusing layers 70A, 80A was incorporated, as the diffuser, one of (1) acrylic beads having an average particle diameter of 30 micrometers and a refractive index of 1.49 ("XC01" manufactured by Sumitomo Chemical Co., Ltd., Japan), (2) acrylic beads having an average particle diameter of 11 micrometers and a refractive index of 1.49 ("MBX" manufactured by Sekisui Chemical Co., Ltd., Japan), (3) glass beads having an average particle diameter of 17 micrometers and a refractive index of 1.535 ("EGB210" manufactured by Toshiba-Ballotini Co., Ltd., Japan), and (4) styrene beads having an average particle diameter of 12 micrometers and a refractive index of 1.59 ("PB3011" manufactured by Sumitomo Chemical Co., Ltd., Japan).

These diffusers (1) to (4) were incorporated into the diffusing layers 70A, 80A of the Fresnel lens sheets 71, 81 in a manner as shown in the following Table 1.

TABLE 1

| | Concentration of Diffuser | | Thickness of |
| --- | --- | --- | --- |
| | on Light-Entering Side | on Observation Side | Diffusing Layer (mm) |
| XC01 2.5t | | 2.0P | — |
| XC01 1.8t | | 3.0P | — |
| XC01 1.8t (2) | 17P | Clear | 0.2 |
| MBX 1.8t | | 1.15P | — |
| MBX 1.8t (2) | 9.0P | Clear | 0.2 |
| EGB 1.8t (2) | 6.8P | Clear | 0.2 |
| EGB 2.5t (2) | 3.4P | Clear | 0.4 |
| PB3011 1.8t | | 0.17P | — |

In the above Table 1, the numeral (e.g., "2.5t") shown next to the type of the diffuser (e.g., "XC01") indicates the thickness (mm) of the substrate of the Fresnel lens sheet 71, 81. The thickness of the Fresnel lens sheet 71, 81 is the sum total of the thickness of the substrate and 0.2 mm, the thickness of the Fresnel lens part formed by using a UV-curable resin. Further, the numeral in parentheses, "(2)", shown next to the numeral (e.g., "1.8t") indicating the thickness (mm) of the substrate represents that the substrate of the Fresnel lens sheet into which the diffuser is incorporated has a two-layered structure (the structure as shown in FIG. 9B). The unit (P) of the concentration of the diffuser is parts by weight (number of grams) of the diffuser incorporated into 100 parts by weight (100 g) of polymethyl methacrylate, the base material.

On the other hand, as the base material of the lenticular lens sheets 72, 82, an impact-resistant methacrylic resin (refractive index 1.51) manufactured by Sumitomo Chemical Co., Ltd., Japan was used as in the case of the above-described Fresnel lens sheets 71, 81. The entire lenticular lens sheets 72, 82 were obtained by subjecting the resin to extrusion molding. As shown in FIGS. 9A and 9B, diffusing layers 70B, 80B having a thickness of 600 micrometers, in which a diffuser having a predetermined particle diameter and refractive index was dispersed were respectively formed on the light-emerging surfaces of the lenticular lens sheets 72, 82.

Into the diffusing layers 70B, 80B was incorporated, as the diffuser, one of (1) glass beads having an average particle diameter of 11 micrometers and a refractive index of 1.535 ("EMB20" manufactured by Toshiba-Ballotini Co., Ltd., Japan), (2) glass beads having an average particle diameter of 17 micrometers and a refractive index of 1.535 ("EGB210" manufactured by Toshiba-Ballotini Co., Ltd., Japan), (3) a 6:1 mixture of acrylic beads having an average particle diameter of 30 micrometers and a refractive index of 1.49 ("XC01" manufactured by Sumitomo Chemical Co., Ltd., Japan) and the above "EGB210" manufactured by Toshiba-Ballotini Co., Ltd., Japan (XC01+EGB-1), and (4) a 2:3 mixture of the above "XC01" manufactured by Sumitomo Chemical Co., Ltd., Japan and the above "EGB210" manufactured by Toshiba-Ballotini Co., Ltd., Japan (XC01+EGB-2).

These diffusers (1) and (4) were incorporated into the diffusing layers 70B, 80B of the lenticular lens sheets 72, 82 in the following manner. Namely, among the above-described diffusers (1) and (4), the diffuser (3), which is a 6:1 mixture of "XC01" manufactured by Sumitomo Chemical Co., Ltd., Japan and "EGB210" manufactured by Toshiba-Ballotini Co., Ltd., Japan, "XC01+EGB-1", was taken as a standard, and the concentration of the "EG210" contained in the "XC01+EGB-1" was made 2.0 P. The concentrations of the other diffusers (1), (2) and (4) were so adjusted that the gain of a rear projection screen obtainable by the combination use of a lenticular lens sheet containing the diffuser (1), (2) or (4), and the Fresnel lens sheet having the diffusing layer indicated by "XC01 2.5t" in the above Table 1 would be almost equal (within ±0.2) to the gain of a rear projection screen obtainable by the combination use of the lenticular lens sheet having the diffusing layer containing the above-described diffuser "XC01+EGB-1", and the above-described Fresnel lens sheet having the diffusing layer indicated by "XC01 2.5t".

Rear projection screens 70, 80 were respectively produced by assembling, in a frame (not shown in the figure), the above-described various Fresnel lens sheets 71, 81 and lenticular lens sheets 72, 82. White images were projected on the thus-produced various rear projection screens 70, 80 by using an LCD projector, and evaluated in terms of the intensity and magnitude (roughness) of scintillation or the like caused on the images. The results obtained are as shown in the following Table 2. The magnitude (roughness) of scintillation or the like was evaluated by the roughness of speckle perceived by an observer when he/she moved his/her eyes. The intensity and magnitude (roughness) of scintillation or the like were evaluated according to 6 ranks of "5" (most excellent) to "0" (poorest).

Further, from the results shown in the above Table 2, the following tendency is confirmed: the intensity of the scintillation or the like becomes lower and the magnitude (roughness) of the same becomes smaller as the difference between the refractive index of the diffuser to be incorporated into the Fresnel lens sheet (FL) on the light source side and that (1.51) of the base material in which the diffuser is dispersed becomes smaller (for instance, compare the "MBX 1.8t" series results with the "PB3011 1.8t" series results, where the average particle diameter of "MBX" is almost equal to that of "PB3011"). Furthermore, it is also confirmed that the magnitude (roughness) of scintillation or the like becomes smaller as the average particle diameter of the diffuser incorporated into the lenticular lens sheet (LL) on the observation side becomes smaller (for instance, compare the "EGB" series results with the "EMB" series results, where the refractive index of "EGB" is equal to that of "EMB"). With respect to the average particle diameter of the diffuser to be incorporated into the lenticular lens sheet (LL), a great improvement is found in the magnitude (roughness) of scintillation between the average particle diameter of 17 micrometers ("EGB210") and that of 11 micrometers ("EMB20"), especially in the vicinity of the average particle diameter of 15 micrometers.

The following is also confirmed from the results shown in the above Table 2: the intensity of scintillation becomes lower and the magnitude (roughness) of the same becomes smaller as the thickness of the Fresnel lens sheet (FL) becomes greater, and when the Fresnel lens sheet is not composed of a single layer but composed of two layers.

COMPARATIVE EXAMPLE

FIG. 10 is an illustration showing a comparative rear projection screen.

TABLE 2

|  | XC01 + EGB-1 | | XC01 + EGB-2 | | EGB | | EMB | |
| --- | --- | --- | --- | --- | --- | --- | --- | --- |
|  | intensity | magnitude (roughness) | intensity | magnitude (roughness) | intensity | magnitude (roughness) | intensity | magnitude (roughness) |
| XC01 2.5t | 5 | 4 | 5 | 4 | 5 | 4 | 5 | 5 |
| XC01 1.8t | 3 | 2 | 3 | 2 | 2 | 2 | 2 | 3 |
| XC01 1.8(2) | 4 | 4 | 4 | 4 | 3 | 4 | 5 | 5 |
| MBX 1.8t | 3 | 2 | 3 | 2 | 2 | 2 | 2 | 3 |
| MBX 1.8t(2) | 4 | 4 | 4 | 4 | 3 | 4 | 5 | 5 |
| EGB 1.8t(2) | 3 | 2 | 2 | 2 | 2 | 2 | 2 | 4 |
| EGB 2.5t(2) | 4 | 4 | 3 | 4 | 3 | 4 | 3 | 4 |
| PB3011 1.8t | 1 | 1 | 1 | 0 | 0 | 0 | 0 | 1 |

XC01: acrylic beads (30 μm, 1.49)
MBX: acrylic beads (11 μm, 1.49)
EGB: glass beads: (17 μm, 1.535)
PB3011: styrene beads (12 μm, 1.59)
EMB: glass beads: (11 μm, 1.535)
XC01 + EGB-1: a 6:1 mixture of "XC01" and "EGB"
XC01 + EGB-2: a 2:3 mixture of "XC01"and "EGB"

The results shown in the above Table 2 demonstrate that those screens produced by using acrylic beads having an average particle diameter of 30 micrometers and a refractive index of 1.49 ("XC01" manufactured by Sumitomo Chemical Co., Ltd., Japan) as the diffuser to be incorporated into the Fresnel lens sheet (FL) on the light source side, and glass beads having an average particle diameter of 11 micrometers and a refractive index of 1.535 ("EMB20" manufactured by Toshiba-Ballotini Co., Ltd., Japan) as the diffuser to be incorporated into the lenticular lens sheet (LL) on the observation side show good results in terms of both the intensity and magnitude (roughness) of scintillation or the like.

In this Comparative Example, a rear projection screen 70 was produced, as shown in FIG. 10, by the combination use of a Fresnel lens sheet 91 having a thickness of 2 mm, made from polymethyl methacrylate, containing no diffuser, and a lenticular lens sheet 92 having a thickness of 1 mm, made from polymethyl methacrylate. Into the lenticular lens sheet 72 (diffusing layer 90B), 5 parts by weight of glass beads having an average particle diameter of 11 micrometers and a refractive index of 1.535 were homogeneously incorporated.

As the base material of the Fresnel lens sheet 91, and that of the lenticular lens sheet 92, an impact-resistant methacrylic resin (refractive index 1.51) manufactured by Sumitomo Chemical Co., Ltd., Japan was used. As the glass beads having an average particle diameter of 11 micrometers and a refractive index of 1.535, "EMB20" manufactured by Toshiba-Ballotini Co., Ltd., Japan was used.

An image was projected on the thus-produced rear projection screen 90 by using an LCD projector, and observed for evaluation. As a result, it was confirmed that the intensity of scintillation caused on the image was high and that the quality of the image was poor.

According to the present invention, since at least two diffusing parts are separately provided on one lens sheet or optical sheet, or on a plurality of lens sheets or optical sheets, it is possible to make the intensity of scintillation low by using a diffuser in an amount smaller than that of a diffuser which is required for a lens sheet having only one diffusing part to attain the equally low intensity of scintillation. Further, by respectively incorporating diffusers of different types into two diffusing parts, not only the intensity of scintillation or the like can be made low, but also the magnitude (roughness) of the same can be made small. Scintillation or the like to be caused on an image can thus be effectively decreased without lowering the resolution and brightness of the image.

What is claimed is:

1. A rear projection screen comprising:

a lens sheet comprising a Fresnel lens part, a lenticular lens part, and a non-diffusing part, wherein said Fresnel lens part is placed on a light-entering side and comprises at least one diffusing part; said lenticular lens part is placed on a light-emerging side and comprises at least one diffusing part; said Fresnel lens part and said lenticular lens part are spaced apart from each other by the non-diffusing part; the diffusing part of said Fresnel lens part is provided on a light-entering side surface of the lens sheet; the diffusing part of said lenticular lens part is provided on a light-emerging side surface of the lens sheet; the diffusing part of said Fresnel lens part has a diffusing power lower than the diffusing power of the diffusing part of said lenticular lens part; and the diffusing part of said Fresnel lens part is formed by incorporating first diffusive fine particles into a first base material, and the diffusing part of said lenticular lens part is formed by incorporating second diffusive fine particles into a second base material, wherein a refractive index difference between the first diffusive fine particles and the first base material is smaller than a refractive index difference between a refractive index of the second diffusive fine particles and the second base material.

2. The rear projection screen according to claim 1, wherein the second diffusive fine particles have an average particle diameter not greater than 15 micrometers.

3. A rear projection screen comprising:

a Fresnel lens sheet;

a lenticular lens sheet; and a non-diffusing part, wherein said Fresnel lens sheet and said lenticular lens sheet each comprise at least one diffusing part; said Fresnel lens sheet and said lenticular lens sheet, as a whole, comprise a plurality of diffusing parts spaced apart from each other by said non-diffusing part; the diffusing part of said Fresnel lens sheet or said lenticular lens sheet placed on a light-source side has a diffusing power lower than the diffusing power of the diffusing part of said lenticular lens sheet or said Fresnel lens sheet placed on an observation side; and the diffusing part of said Fresnel lens sheet or said lenticular lens sheet placed in a light-source side is formed by incorporating first diffusive fine particles into a first base material, and the diffusing part of said lenticular lens sheet or said Fresnel lens sheet placed on an observation side is formed by incorporating second diffusive fine particles into a second base material, wherein a refractive index difference between the first diffusive fine particles and the first base material is smaller than a refractive index difference between a refractive index of the second diffusive fine particles and the second base material.

4. The rear projection screen according to claim 3, wherein the diffusing parts are provided on the respective surfaces of said Fresnel lens sheet and said lenticular lens sheet.

5. The rear projection screen according to claim 3, wherein the diffusing part of said Fresnel lens sheet or said lenticular lens sheet placed on a light-source side is provided on a light-entering side surface, and the diffusing part of said lenticular lens sheet or said Fresnel lens sheet placed on an observation side is provided on a light-emerging side surface.

6. The rear projection screen according to claim 3, wherein the second diffusive fine particles have an average particle diameter not greater than 15 micrometers.

7. The rear projection screen according to claim 3, wherein said Fresnel lens sheet is placed on a light-source side, and said lenticular lens sheet is placed on an observation side.

8. The rear projection screen according to claim 7, wherein a Fresnel lens part of said Fresnel lens sheet is provided on a light-emerging side.

9. A rear projection screen comprising:

a Fresnel lens sheet; and a lenticular lens sheet, wherein said Fresnel lens sheet and said lenticular lens sheet each comprise at least one diffusing part; said Fresnel lens sheet and/or said lenticular lens sheet have at least one non-diffusing part; said Fresnel lens sheet and said lenticular lens sheet, as a whole, comprise a plurality of diffusing parts spaced apart from each other by said non-diffusing part; the diffusing part of said Fresnel lens sheet or said lenticular lens sheet placed on a light-source side has a diffusing power lower than the diffusing power of the diffusing part of said lenticular lens sheet or said Fresnel lens sheet placed on an observation side; and the diffusing part of said Fresnel lens sheet or said lenticular lens sheet placed in a light-source side is formed by incorporating first diffusive fine particles into a first base material, and the diffusing part of said lenticular lens sheet or said Fresnel lens sheet placed on an observation side is formed by incorporating second diffusive fine particles into a second base material, wherein a refractive index difference between the first diffusive fine particles and the first base material is smaller than a refractive index difference between a refractive index of the second diffusive fine particles and the second base material.

10. A rear projection screen comprising:

a Fresnel lens sheet;

a lenticular lens sheet;

a flat panel; and a non-diffusing part, wherein said Fresnel lens sheet and said flat panel each comprise at least one diffusing part; said lenticular lens sheet comprises a non-diffusing part; said Fresnel lens sheet, said lenticular lens sheet, and said flat panel, as a whole, comprise a plurality of diffusing parts spaced apart from each other by said non-diffusing part; and the diffusing part of said Fresnel lens sheet or said flat panel placed on a light-source side has a diffusing power lower than the diffusing power of the diffusing part of said flat panel or said Fresnel lens sheet placed on a observation side.

11. The rear projection screen according to claim 10, wherein said lenticular lens sheet comprises at least one diffusing part.

12. The rear projection screen according to claim 10, wherein the diffusing parts are provided on the respective surfaces of said Fresnel lens sheet and said flat panel.

13. The rear projection screen according to claim 10, wherein the diffusing part of said Fresnel lens sheet or said flat panel placed on a light-source side is provided on a light-entering side surface, and the diffusing part of said flat panel or said Fresnel lens sheet placed on an observation side is provided on a light-emerging side surface.

14. The rear projection screen according to claim 10, wherein the diffusing part of said Fresnel lens sheet or said flat panel placed on a light-source side is formed by incorporating first diffusive fine particles into a first base material, and the diffusing part of said flat panel or said Fresnel lens sheet placed on an observation side is formed by incorporating second diffusive fine particles into a second base material, wherein a refractive index difference between the first diffusive fine particles and the first base material is smaller than a refractive index difference between a refractive index of the second diffusive fine particles and the second base material.

15. The rear projection screen according to claim 14, wherein the second diffusive fine particles have an average particle diameter not greater than 15 micrometers.

16. A rear projection screen comprising:

a Fresnel lens sheet;

a lenticular lens sheet; and a flat panel, wherein said Fresnel lens sheet and said flat panel each comprise at least one diffusing part; said lenticular lens sheet comprises a non-diffusing part; said Fresnel lens sheet, said lenticular lens sheet, and said flat panel, as a whole, comprise a plurality of diffusing parts spaced apart from each other by said non-diffusing part; and the diffusing part of said Fresnel lens sheet or said flat panel placed on a light-source side has a diffusing power lower than the diffusing power of the diffusing part of said flat panel or said Fresnel lens sheet placed on a observation side.

* * * * *